United States Patent [19]

Mueller

[11] Patent Number: 4,643,926

[45] Date of Patent: Feb. 17, 1987

[54] FLEXIBLE MEDICAL SOLUTION POUCHES

[75] Inventor: Walter B. Mueller, Inman, S.C.

[73] Assignee: W. R. Grace & Co., Cryovac Div., Duncan, S.C.

[21] Appl. No.: 728,114

[22] Filed: Apr. 29, 1985

[51] Int. Cl.$^4$ .................. B65D 65/02; B32B 27/32; B32B 27/36

[52] U.S. Cl. .................. 428/35; 428/349; 428/483; 428/516; 428/517

[58] Field of Search .............. 428/35, 349, 515, 516, 428/517, 520, 483, 480; 426/127; 206/484.2

[56] References Cited

U.S. PATENT DOCUMENTS

| | | | |
|---|---|---|---|
| 4,188,443 | 2/1980 | Mueller et al. | 428/483 |
| 4,274,900 | 6/1981 | Mueller et al. | 428/483 |
| 4,352,849 | 11/1982 | Mueller | 428/520 |
| 4,359,495 | 11/1982 | Schroeder et al. | 428/516 |
| 4,391,862 | 7/1983 | Bornstein et al. | 428/516 |
| 4,407,874 | 11/1983 | Gehrke | 428/516 |
| 4,528,220 | 9/1983 | Hwo | 428/516 |

FOREIGN PATENT DOCUMENTS

| | | | |
|---|---|---|---|
| 0087080 | 8/1983 | European Pat. Off. | 428/515 |
| 2138431A | 10/1984 | United Kingdom . | |
| 2139634A | 11/1984 | United Kingdom . | |

*Primary Examiner*—John E. Kittle
*Assistant Examiner*—James J. Seidleck
*Attorney, Agent, or Firm*—John J. Toney; William D. Lee, Jr.; Mark B. Quatt

[57] ABSTRACT

A flexible film suitable for medical solution pouches and parenteral materials generally includes a sealant layer of ethylene propylene copolymer, modified ethylene propylene copolymer, or flexible copolyester; one or more interior layers including elastomeric polymeric materials, and an outer layer of ethylene propylene copolymer or a flexible copolyester.

5 Claims, 4 Drawing Figures

FLEXIBLE MEDICAL SOLUTION POUCHES

This invention relates to autoclavable flexible films suitable for the packaging of medical solutions.

Currently, it is common medical practice to supply liquids such as medical solutions for parenteral administration in the form of disposable, flexible pouches. These pouches should be characterized by collapsibility, transparency, and adequate mechanical strength. They must also be able to resist the relatively high temperatures required for heat sterilization of their contents, for example in an autoclave. Typically, medical solutions and the like are autoclaved at about 253° F. for periods of 15 to 30 minutes.

Presently, such flexible pouches are typically made from a highly plasticized polyvinyl chloride. While meeting the requirements mentioned above, polyvinyl chloride may have some undesirable properties for use as a medical solution pouch because of the possibility of migration of plasticizer from the polyvinyl chloride into the medical solution or the other contents of the pouch so that the solution may become contaminated by potentially toxic material. A question has also arisen concerning whether PVC is adequately chemically neutral to medical solutions. It has also been found that polyvinyl chloride becomes brittle at relatively low temperatures.

Embrittlement and stress-cracking, particularly of the outer surface of medical pouches, has been found to occur in other non-PVC pouches. It is desirable to provide a pouch for the packaging of medical solutions which substantially reduces or eliminates stress-cracking and embrittlement of the pouch material.

Of interest is U.S. Pat. No. 4,401,536 issued to Lundell et al which discloses the use of a blend of medical grade radiation-stabilized polypropylene and a copolymer of ethylene and a comonomer selected from the group consisting of vinyl esters of saturated carboxylic acids and alkyl esters of alpha, beta ethylenically unsaturated carboxylic acids, the blend being irradiated.

OBJECTS

It is an object of the present invention to provide a film suitable for the packaging of medical solutions, the film having good flexibility.

Another object of the present invention is to provide a film suitable for the packaging of medical solutions characterized by good optical properties and a low degree of haze after autoclaving of the package.

Still another object of the present invention is to provide a film suitable for the packaging of medical solutions characterized by high mechanical strength.

An additional object of the present invention is to provide a film suitable for the packaging of medical solutions characterized by sufficient barrier properties to eliminate or reduce the need for separate overwrap material to insure that the concentration of the medical solution in the pouch is not adversely effected.

DEFINITIONS

The terms "flexible" and the like and "elastomeric" and the like are used herein to define specific polymeric materials as well as characteristics of a resulting pouch or bag whereby improved flexibility and/or collapsibility of the pouch or bag is obtained by the use of these specific polymeric materials. Flexible materials may be characterized by a modulus of preferably less than 50,000 PSI (ASTM D-882-81) and more preferably less than 40,000 PSI (ASTM-D-882-81).

The term "film" and the like refers to a thermoplastic material suitable for packaging and having one or more layers of polymeric materials which may be bonded by any suitable means well known in the art.

The term "polymer", "polymeric", and the like, unless specifically defined or otherwise limited, generally includes homopolymers, copolymers and terpolymers and blends and modifications thereof.

The term "interior" and the like is used herein to refer to a layer of a multilayer film which is not a skin or surface layer, or sealant layer, of the film.

The term "melt flow" and "melt flow index" is used herein as the amount, in grams, of a thermoplastic resin which can be forced through a given orifice under a specified pressure and temperature within 10 minutes. The value should be determined in accordance with ASTM D 1238-79.

The term "very low density polyethylene" is used herein to define a copolymer of polyethylene with densities below 0.910 gm/cc, preferably between 0.900 to 0.906 g, cc. and including densities as low as 0.860 gm/cc, as measured by ASTM D-1505.

The term "ethylene vinyl acetate copolymer" (EVA) is used herein to refer to a copolymer formed from ethylene and vinyl acetate monomers wherein the ethylene derived units in the copolymer are present in major amounts and the vinyl acetate derived units in the copolymer are present in minor amounts.

The term "ethylene propylene copolymer" is used herein to refer to a copolymer formed from polypropylene monomer and minor amounts, usually less than 6%, of ethylene.

The term "copolyester" and the like is applied to polyesters synthesized from more than one diol and a dibasic acid. Copolyesters as used herein may also be characterized as copolymers of polyether and polyethylene terephthalate. More preferably copolyesters as used herein may be characterized as polymeric materials derived from 1,4 cyclohexane dimethanol, 1,4 cyclohexane dicarboxylic acid, and polytetramethylene glycol ether, or equivalents of any of the above, as reactants.

The term "modified" and the like is used herein to refer to a polymeric material in which some or all of the substituents are replaced by other materials, providing a change in properties such as improved flexibility or elastomeric properties.

SUMMARY OF THE INVENTION

A flexible film in accordance with the invention comprises a sealant layer comprising polymeric material selected from the group consisting of ethylene propylene copolymer, modified ethylene propylene copolymer, and flexible copolyester; at least one interior layer comprising a polymeric material which imparts flexibility to the film; and an outer layer comprising ethylene propylene copolymer or flexible copolyester.

In another embodiment of the invention, a flexible film comprises a sealant layer comprising ethylene propylene copolymer or modified ethylene propylene copolymer; an interior layer comprising a polymeric material which imparts flexibility to the film; and an outer layer comprising ethylene propylene copolymer or flexible copolyester.

In still another preferred embodiment of the invention, a flexible film comprises a sealant layer comprising ethylene propylene copolymer or modified ethylene propylene copolymer; a second or interior layer comprising a polymeric material which imparts flexibility to the film; a third or adhesive layer; and an outer layer comprising flexible copolyester.

In an additional embodiment of the invention, a flexible film comprises a sealant layer comprising ethylene propylene copolymer or flexible copolyester; a second or interior layer comprising (1) a blend of ethylene propylene copolymer with a polymeric material which imparts flexibility to the film, or (ii) modified ethylene vinyl acetate copolymer; a third or interior layer comprising a polymeric material which imparts flexibility to the film; a fourth or interior layer comprising (i) a polymeric material or blend of materials substantially similar to the second layer, or (ii) ethylene methacrylate copolymer; and a fifth or outer layer comprising flexible copolyester or ethylene propylene copolymer.

Another embodiment of a flexible film in accordance with the present invention comprises a sealant layer comprising ethylene propylene copolymer; a second or interior layer comprising a blend of ethylene propylene copolymer with a polymeric material which imparts flexibility to the film; a third or interior layer comprising a polymeric material selected from the group consisting of a blend of ethylene propylene monomer and ethylene vinyl acetate copolymer, a blend of ethylene propylene monomer and polypropylene, and ethylene propylene diene monomer; a fourth or interior layer comprising (i) a blend substantially similar to the second or interior layer, or (ii) ethylene methacrylate copolymer; a fifth or interior layer comprising (i) a blend of ethylene propylene monomer and ethylene vinyl acetate copolymer, or (ii) ethylene propylene diene monomer; a sixth or interior layer comprising (i) a blend substantially similar to the fourth or interior layer, or (ii) an elastomeric adhesive material; and a seventh or outer layer comprising ethylene propylene copolymer or flexible copolyester.

DETAILED DESCRIPTION OF THE PREFERRED EMBODIMENTS

Figure 1:
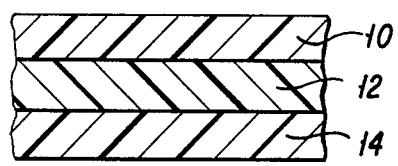
FIG. 1 is a schematic cross-section of a three layer film made in accordance with the invention.

FIG. 1 shows a three layer film in accordance with the invention. Sealing layer 10 is an ethylene propylene copolymer (EPC) or modified EPC. A suitable EPC is Eltex KS 409X6206 available from Solvay. This copolymer has an ethylene content of about 3.8%. A suitable modified EPC is Cosden Z4650 available from Cosden Chemical Company. Polyallomers may also be used, such as ethylene propylene block copolymer, available from Eastman as M7853-368A, having a melt flow index of about 12. The sealing layer will be in contact with the medical solution or other material to be contained within flexible bags made from the flexible films of the present invention.

Interior layer 12 may be a blend of ethylene propylene copolymer with a blend of ethylene propylene monomer (EPM) and ethylene vinyl acetate copolymer (EVA). The EPC component of the blend is preferably a low modulus, low melting point EPC such as COSDEN Z7650. A suitable EPM/EVA blend is available from Exxon as Exxon PA 24. This material is a blend of an ethylene propylene rubber or ethylene propylene monomer with ethylene vinyl acetate copolymer. Alternatively, interior layer 12 may be a modified ethylene propylene copolymer such as COSDEN Z 4650 available from Cosden Oil and Chemical Company. Interior layer 12 may also be an elastomeric terpolymer such as Vistalon 3708, an ethylene propylene diene monomer (EPDM) made by Exxon. Another alternative material suitable for layer 12 is ethylene methacrylate copolymer such as commercially available Gulf Resin 2205 having 20% methacrylate and balance ethylene and having a density of 0.942 and a melt index of about 2.4, or DuPont Alathon 3175. Still another material for layer 12, is a modified EVA such as Bynel CXAE 162, available from DuPont.

Outside layer 14 of the three layer embodiment of the present invention is preferably ethylene propylene copolymer, or a flexible copolyester, more preferably a copolymer of polyether and polyethylene terephthalate, such as Eastman PCCE 9967 from Eastman Chemical Products, Inc. Other suitable flexible copolyesters are PCCE 9964, PCCE 9965, and PCCE 9966, all available from Eastman. These particular copolyesters are characterized by inherent viscosities ranging from 1.05 to 1.28, and by the use of 1,4 cyclohexane dimethanol, 1,4 cyclohexane dicarboxylic acid, and polytetramethylene glycol ether as reactants in producing the flexible copolyester.

Three-layer embodiments are typically characterized by a second or interior layer which is considerably thicker than the remaining layers. An exception is a three-layer embodiment comprising modified EPC in the sealing layer 10; modified EVA in interior layer 12; and flexible copolyester in outside layer 14. In this embodiment, the sealing layer 10 is considerably thicker.

Figure 2:
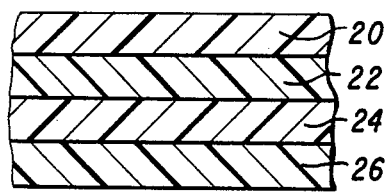
FIG. 2 is a schematic cross-section of a four layer film made in accordance with the invention.

In a four layer embodiment of the present invention, and referring to FIG. 2, sealant layer 20 preferably comprises ethylene propylene copolymer or block copolymer, or a modified EPC such as Cosden Z 4650. Interior layer 22 may be an EVA, a modified ethylene vinyl acetate copolymer or a modified ethylene propylene copolymer as described above. Interior layer 24 is an adhesive layer, preferably ethylene methacrylate copolymer, or a modified EVA such as Bynel CXAE-162. The fourth or outside layer 26 is preferably a flexible copolyester.

Four-layer embodiments typically include an interior layer such as EVA which is substantially thicker than the remaining layers.

Figure 3:
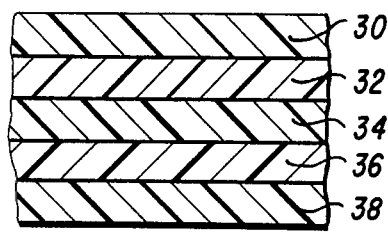
FIG. 3 is a schematic cross-section of a five layer film made in accordance with the invention.

FIG. 3 shows a five layer laminate made in accordance with the present invention. Sealing layer 30 is preferably an ethylene propylene copolymer such as the Eltex KS409X6206 or for example Norchem 8310 GO. Layer 30 may also be a flexible copolyester.

Interior layer 32 may be a blend of ethylene propylene copolymer and a material which imparts improved flexibility to the pouch or bag material. Preferred polymeric materials which contribute such improved flexibility are for example elastomerized materials such as modified EPC and blends of EPM and EVA, examples of each having already been noted. Other suitable blending materials are EPDM and very low density polyethylene (VLDPE). A suitable VLDPE is DFDA 1137 sold under the tradename Ucar FLX by Union Carbide. This material has a density of about 0.906 grams per cubic centimeter with a melt index of about 0.8 grams per 10 minutes. Still another suitable material is modified EVA adhesive, such as Bynel CXAE-162. This resin has a melt index of about 0.8.

The third or interior layer 34 may be a modified EPC or a blend of a low modulus low melting point EPC, such as Cosden Z7650, blended with the EPM/EVA blend. Alternatively, interior layer 34 may comprise the EPM/EVA blend without the introduction of a separate component. Interior layer 34 is typically characterized by the presence of a material or blended materials which will enhance the flexibility of the resulting medical solution pouch or bag. Thus, materials such as EPDM, EVA, blends of EPDM and EVA, blends of EPDM AND VLDPE, and VLDPE are also very suitable for use in this interior layer.

The fourth or interior layer 36 is preferably either a blend of EPC and modified EPC; a blend of EPC and EPM/EVA blend; or a material such as ethylene methacrylate copolymer which will function as a tying agent between the third or interior layer 34 and outside layer 38, in the case of a flexible copolyester in outside layer 38. Interior layer 36 may also be EPC blended with EPDM or VLDPE. A modified EVA adhesive may also be utilized in this layer. Thus, in a five layer structure in accordance with the present invention, the fourth or interior layer 36 and the second or interior layer 32 are preferably similar and will enclose a core layer including materials already described for interior layer 34.

The outside layer 38 may be either a flexible copolyester such as the copolymer of polyether and polyethylene terephthalate discussed above, or ethylene propylene copolymer.

Preferred embodiments of the five layer structure made in accordance with the present invention will generally be palindromic or symmetrical in nature. This is particularly true in those embodiments having outer layers of EPC, and similar compositions for interior layers 32 and 36. The overall pouch structure may also be asymmetrical, such as where interior layer 36 is a tie layer, for example EMA, or modified EVA, which will function as a tying agent between layers 34 and 38.

Five-layer embodiments are typically characterized by a third or interior layer which is considerably thicker than the remaining layers.

Figure 4:
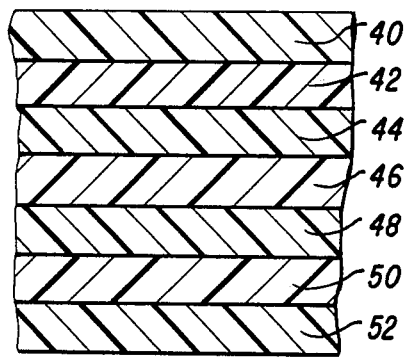
FIG. 4 is a schematic cross-section of a seven layer film made in accordance with the invention.

FIG. 4 shows a seven layer flexible laminate in accordance with the present invention. Sealant layer 40 preferably comprises an ethylene propylene copolymer. Interior layer 42 is preferably made from a blend of ethylene propylene copolymer and EPM/EVA blend. A suitable EPM/EVA blend is for example Exxon PA24. Interior layer 42 may also be made from a blend of EPC and EPM/polypropylene (EPM/PP) blend. A suitable EPM/PP blend is Exxon PA 30. Interior layer 44 may comprise either an EPM/EVA blend, EPM/PP blend, or EPDM, such as the ethylene propylene diene monomer available from Exxon as Vistalon 3708. Interior layer 46 is preferably either a blend of EPM/EVA and EPC; EPM/PP and EPC; or ethylene methacrylate copolymer such as Gulf 2205 available from Gulf Oil Chemicals Co. This EMA contains 20% methacrylate and balance ethylene, and has a melt index of about 2.4 and a density of about 0.942. The EPM/EVA and EPM/PP blends may for example be the Exxon PA24 or Exxon PA30 respectively. Interior layer 48 may be the EPM/EVA blend listed above or an ethylene propylene diene monomer such as Vistalon 3708. Interior layer 50 is preferably either a blend of EPM/EVA with EPC, EPM/PP with EPC; ethylene methacrylate copolymer; or modified EVA adhesive. Suitable examples of these materials are given above. Finally, outer layer 52 is preferably either an ethylene propylene copolymer or flexible copolyester.

The films as described are preferably manufactured by a cast coextrusion process.

EXAMPLES

Exemplary multi-layer structures were cast coextruded and irradiated. These structures are viewed as potential replacements for polyvinyl chloride bags. Critical parameters which were measured include moisture barrier properties, tensile strength and elongation at break, and modulus of elasticity. Also important for medical solution applications are the optical properties such as haze, total transmission, and gloss. Examples 1 through 18, in part reflected in the detailed description of the preferred embodiments hereinbefore described, are listed below with their respective formulations, beginning with the outside layer and ending with the inside or sealant layer. Unless otherwise denoted, Examples 1–18 included the following materials:

EPC: Eltex KS409x6206;
EPM-EVA: PA 24;
EPM-PP=PA-30;
EPDM: Vistalon 3708;
EMA: Gulf 2207;
modified EPC: Z4650;
flexible copolyester: PCCE 9967;
EVA (as distinct material): ELVAX 3175;
VLDPE: DFDA 1137;
low modulus EPC: Z7650; and
modified EVA: CXA-E162.

Example 1 is a control bag material comprising polyvinyl chloride.

In Example 2, the multi-layer film comprised EPC-/EPDM/EPC.

In Example 3, the multi-layer film comprised EPC-/EPM-PP blend+EPC/EPM-PP blend/EPM-PP blend+EPC/EPDM/EPM-PP+EPC/EPC.

In Example 4, the multi-layer film comprised EPC-/EPM-EVA blend+EPC/EPM-EVA blend/EPM-EVA blend+EPC/EPM-EVA blend/EPM-EVA blend+EPC/EPC.

In Example 5, the multi-layer film comprised flexible copolyester/EMA/EPM-EVA blend/EMA/EPM-EVA blend/EPM-EVA blend+EPC/EPC.

In Example 6, the multi-layer film comprised flexible copolyester/EMA/EPDM/EMA/EPM-EVA+EPC-/EPC.

In Example 7, the multi-layer film comprised EPC-/EPM-EVA+EPC/EPDM/EPM-EVA blend+EPC-/EPDM/EPM-EVA blend+EPC/EPC.

Example 8 is an example inserted for comparison and includes a core layer of EVA sandwiched between outer layers of EPC.

In Example 9, the multi-layer film comprised EPC/-low modulus, low melting point EPC/EPC with a total structure thickness of about 9 mils.

In Example 10, the multi-layer film comprised a structure identical to that of Example 9 but with a total thickness of about 6 mils.

In Example 11, the multi-layer film comprised EPC-/EPC plus EPM-EVA blend/EPC.

In Example 12, the multi-layer film comprised EPC-/EPC plus EPM-EVA blend/EPM-EVA blend/EPC plus EPM-EVA blend/EPC.

In Example 13, the multi-layer film comprised the same structure as in Example 12, but with the use of Norchem 8310 GO EPC in the sealant layer instead of the Eltex KS409X6206 EPC used in Example 12 and the other examples.

In Example 14, the multi-layer film comprised EPC-/EPC plus EPDM/EPDM/EPC plus EPDM/EPC.

In Example 15, the multi-layer film comprised EPC-/EPC plus EPM-EVA blend/EPDM+EVA/EPC plus EPM-EVA blend/EPC.

In Example 16, the multi-layer film comprised EPC-/EPC plus VLDPE/VLDPE/EPC-VLDPE/EPC.

In Example 17, the multi-layer film was the same as that of Example 16, but with an irradiation of 5 MR instead of 3 MR.

In Example 18, the multi-layer film comprised EPC/-low modulus, low melting point EPC plus modified EPC/modified EPC/low modulus, low melting point EPC+modified EPC/EPC.

Tables 1 through 5 demonstrate the results of physical testing of Examples 1 through 18 for selected physical properties.

TABLE 1

|  | Example 1 | Example 2 | Example 3 | Example 4 |
|---|---|---|---|---|
| Tensile at Break and 73° F. (PSI)[1] | | | | |
| Av.[2] Long | 38.4 × 100 | 21.7 × 100 | 30.2 × 100 | 33.1 × 100 |
| Std. Dev. | 2.2 × 100 | 4.9 × 100 | 2.6 × 100 | 3.1 × 100 |
| 95% C.L.[3] | 3.5 × 100 | 7.7 × 100 | 4.2 × 100 | 5.0 × 100 |
| Av. Trans. | 36.5 × 100 | 29.4 × 100 | 23.9 × 100 | 29.0 × 100 |
| Std. Dev. | 2.4 × 100 | 4.8 × 100 | 0.8 × 100 | 4.2 × 100 |
| 95% C.L. | 3.8 × 100 | 7.7 × 100 | 1.3 × 100 | 6.7 × 100 |
| Gauge Long.[4] | 13.53 | 8.38 | 9.03 | 8.60 |
| Std. Dev. | 0.75 | 0.41 | 1.15 | 0.70 |
| 95% C.L. | 1.19 | 0.65 | 1.83 | 1.12 |
| Gauge Trans. | 14.63 | 8.30 | 7.30 | 7.93 |
| Std. Dev. | 0.22 | 0.29 | 0.24 | 0.69 |
| 95% C.L. | 0.35 | 0.47 | 0.39 | 1.11 |
| Elongation at Break and 73° F. (PSI)[5] | | | | |
| Av. Long | 560. | 796. | 942. | 1002. |
| Std. Dev. | 20. | 79. | 49. | 56. |
| 95% C.L. | 32. | 126. | 79. | 89. |
| Av. Trans. | 562. | 1188. | 1008. | 1037. |
| Std. Dev. | 42. | 43. | 17. | 49. |
| 95% C.L. | 66. | 68. | 27. | 78. |
| Modulus at 73° F. (PSI)[6] | | | | |
| Av. Long. | 4.9 × 1000 | 13.0 × 1000 | 38.5 × 1000 | 15.8 × 1000 |
| Std. Dev. | 0.2 × 1000 | 0.6 × 1000 | 3.5 × 1000 | 0.1 × 1000 |
| 95% C.L. | 0.3 × 1000 | 1.0 × 1000 | 5.6 × 1000 | 0.2 × 1000 |
| Av. Trans. | 5.4 × 1000 | 10.6 × 1000 | 34.5 × 1000 | 16.1 × 1000 |
| Std. Dev. | 0.3 × 1000 | 0.4 × 1000 | 1.5 × 1000 | 1.3 × 1000 |
| 95% C.L. | 0.4 × 1000 | 0.6 × 1000 | 2.5 × 1000 | 2.1 × 1000 |
| Gauge Long. | 14.22 | 8.60 | 9.71 | 8.93 |
| Std. Dev. | 0.45 | 1.29 | 0.62 | 1.50 |
| 95% C.L. | 0.71 | 2.05 | 0.98 | 2.39 |
| Gauge Trans. | 13.39 | 9.08 | 7.21 | 8.85 |
| Std. Dev. | 0.07 | 0.07 | 0.22 | 0.20 |
| 95% C.L. | 0.11 | 0.12 | 0.35 | 0.32 |
| Optical Properties 73° F. | | | | |
| Haze (%)[7] | | | | |
| Avg. | 2.6 | 3.1 | 20.0 | 13.2 |
| Std. Dev. | 0.2 | 1.6 | 1.0 | 0.6 |
| 95% C.L. | 0.3 | 2.6 | 1.6 | 1.0 |
| Gauge | 13.03 | 7.33 | 8.85 | 8.65 |
| Std. Dev. | 0.05 | 0.25 | 0.75 | 1.05 |
| 95% C.L. | 0.08 | 0.40 | 1.19 | 1.67 |
| Total Transmission (%)[8] | | | | |
| Avg. | 89.9 | 91.8 | 90.1 | 89.0 |
| Std. Dev. | 0.2 | 0.2 | 0.8 | 0.3 |
| 95% C.L. | 0.4 | 0.4 | 1.2 | 0.5 |
| Gloss (45°)[9] | | | | |
| Avg. | 73. | 73. | 66. | 58. |
| Std. Dev. | 1. | 1. | 1. | 7. |
| 95% C.L. | 1. | 2. | 2. | 10. |
| Water Vapor Transmission at 100° F.[10] | | | | |
| Sample 1 | 0.58 | 0.41 | 0.15 | 0.45 |
| Sample 2 | 0.56 | 0.39 | 0.18 | 0.43 |
| Sample 3 | 0.51 | 0.36 | 0.19 | 0.45 |
| Gauge | | | | |

TABLE 1-continued

|  | Example 1 | Example 2 | Example 3 | Example 4 |
|---|---|---|---|---|
| Sample 1 | 13.54 | 7.96 | 8.99 | 9.36 |
| Sample 2 | 14.51 | 8.99 | 8.97 | 9.52 |
| Sample 3 | 14.59 | 9.49 | 8.78 | 8.69 |

TABLE 2

|  | Example 5 | Example 6 | Example 7 |
|---|---|---|---|
| Tensile at Break and 73° F. (PSI)[1] | | | |
| Av.[2] Long | 25.3 × 100 | 28.7 × 100 | 40.4 × 100 |
| Std. Dev. | 0.8 × 100 | 1.3 × 100 | 3.6 × 100 |
| 95% C.L.[3] | 1.3 × 100 | 2.1 × 100 | 5.7 × 100 |
| Av. Trans. | 19.1 × 100 | 21.5 × 100 | 25.5 × 100 |
| Std. Dev. | 1.9 × 100 | 2.2 × 100 | 2.2 × 100 |
| 95% C.L. | 2.9 × 100 | 3.6 × 100 | 3.5 × 100 |
| Gauge Long.[4] | 7.70 | 8.20 | 7.38 |
| Std. Dev. | 1.16 | 0.55 | 0.21 |
| 95% C.L. | 1.85 | 0.87 | 0.33 |
| Gauge Trans. | 7.28 | 7.43 | 7.03 |
| Std. Dev. | 0.15 | 0.31 | 0.22 |
| 95% C.L. | 0.24 | 0.49 | 0.35 |
| Elongation at Break and 73° F. (PSI)[5] | | | |
| Av. Long | 779. | 777. | 983. |
| Std. Dev. | 22. | 9. | 38. |
| 95% C.L. | 36. | 14. | 61. |
| Av. Trans. | 724. | 798. | 1005. |
| Std. Dev. | 41. | 54. | 35. |
| 95% C.L. | 66. | 86. | 55. |
| Modulus at 73° F. (PSI)[6] | | | |
| Av. Long. | 12.1 × 1000 | 11.2 × 1000 | 21.9 × 1000 |
| Std. Dev. | 0.7 × 1000 | 0.8 × 1000 | 1.2 × 1000 |
| 95% C.L. | 1.0 × 1000 | 1.2 × 1000 | 1.9 × 1000 |
| Av. Trans. | 10.3 × 1000 | 10.8 × 1000 | 21.0 × 1000 |
| Std. Dev. | 1.0 × 1000 | 0.5 × 1000 | 1.5 × 1000 |
| 95% C.L. | 1.5 × 1000 | 0.8 × 1000 | 2.4 × 1000 |
| Gauge Long. | 8.64 | 8.03 | 8.78 |
| Std. Dev. | 0.40 | 0.67 | 0.89 |
| 95% C.L. | 0.64 | 1.07 | 1.42 |
| Gauge Trans. | 8.03 | 8.18 | 7.94 |
| Std. Dev. | 0.22 | 0.34 | 0.60 |
| 95% C.L. | 0.35 | 0.54 | 0.96 |
| Optical Properties at 73° F. Haze (%)[7] | | | |
| Avg. | 9.0 | 1.6 | 2.4 |
| Std. Dev. | 0.8 | 0.1 | 0.3 |
| 95% C.L. | 1.3 | 0.2 | 0.5 |
| Gauge | 8.28 | 7.15 | 7.50 |
| Std. Dev. | 0.69 | 0.95 | 0.99 |
| 95% C.L. | 1.11 | 1.51 | 1.58 |
| Total Transmission (%)[8] | | | |
| Avg. | 89.8 | 91.8 | 91.9 |
| Std. Dev. | 0.2 | 0.1 | 0.2 |
| 95% C.L. | 0.3 | 0.2 | 0.3 |
| Gloss (45°)[9] | | | |
| Avg. | 75. | 86. | 83. |
| Std. Dev. | 5. | 2. | 1. |
| 95% C.L. | 7. | 3. | 1. |
| Water Vapor Transmission at 100° F.[10] | | | |
| Sample 1 | 1.05 | 0.72 | 0.40 |
| Sample 2 | 0.98 | 0.85 | 0.39 |
| Sample 3 | 1.09 | 0.68 | 0.40 |
| Gauge | | | |
| Sample 1 | 8.20 | 8.63 | 8.49 |
| Sample 2 | 8.51 | 7.71 | 7.34 |
| Sample 3 | 7.61 | 9.56 | 7.82 |

TABLE 3

|  | Example 8 | Example 9 | Example 10 | Example 11 |
|---|---|---|---|---|
| Tensile at Break and 73° F. (PSI)[1] | | | | |
| Av.[2] Long | 20.0 × 100 | 36.0 × 100 | 40.7 × 100 | 37.8 × 100 |
| Std. Dev. | 1.3 × 100 | 4.4 × 100 | 2.0 × 100 | 3.0 × 100 |
| 95% C.L.[3] | 2.0 × 100 | 7.0 × 100 | 3.1 × 100 | 4.8 × 100 |
| Av. Trans. | 49.0 × 100 | 28.0 × 100 | 45.5 × 100 | 30.7 × 100 |
| Std. Dev. | 5.7 × 100 | 0.2 × 100 | 1.6 × 100 | 1.8 × 100 |
| 95% C.L. | 9.1 × 100 | 0.4 × 100 | 2.6 × 100 | 2.9 × 100 |
| Gauge Long.[4] | 8.54 | 9.59 | 5.52 | 9.14 |
| Std. Dev. | 0.38 | 0.70 | 0.69 | 1.07 |
| 95% C.L. | 0.61 | 1.12 | 1.10 | 1.70 |
| Gauge Trans. | 8.32 | 9.78 | 5.45 | 8.33 |
| Std. Dev. | 0.13 | 0.18 | 0.12 | 0.18 |
| 95% C.L. | 0.20 | 0.28 | 0.19 | 0.29 |
| Elongation at Break and 73° F. (PSI)[5] | | | | |
| Av. Long | 531. | 918. | 877. | 1026. |
| Std. Dev. | 36. | 85. | 46. | 39. |
| 95% C.L. | 57. | 136. | 74. | 62. |
| Av. Trans. | 1064. | 811. | 1066. | 1044. |
| Std. Dev. | 41. | 17. | 27. | 19. |
| 95% C.L. | 65. | 28. | 43. | 30. |
| Modulus at 73° F. (PSI)[6] | | | | |
| Av. Long. | 17.2 × 1000 | 44.7 × 1000 | 35.3 × 1000 | 29.0 × 1000 |
| Std. Dev. | 0.5 × 1000 | 1.6 × 1000 | 1.3 × 1000 | 1.1 × 1000 |
| 95% C.L. | 0.8 × 1000 | 2.5 × 1000 | 2.0 × 1000 | 1.7 × 1000 |
| Av. Trans. | 15.1 × 1000 | 46.3 × 1000 | 33.0 × 1000 | 27.5 × 1000 |
| Std. Dev. | 1.1 × 1000 | 3.8 × 1000 | 0.3 × 1000 | 3.2 × 1000 |
| 95% C.L. | 1.7 × 1000 | 6.1 × 1000 | 0.5 × 1000 | 5.1 × 1000 |
| Gauge Long. | 8.65 | 9.77 | 6.05 | 8.22 |
| Std. Dev. | 0.42 | 0.75 | 0.47 | 0.36 |

TABLE 3-continued

|  | Example 8 | Example 9 | Example 10 | Example 11 |
|---|---|---|---|---|
| 95% C.L. | 0.67 | 1.20 | 0.75 | 0.58 |
| Gauge Trans. | 8.94 | 9.64 | 6.17 | 8.56 |
| Std. Dev. | 0.24 | 0.33 | 0.10 | 0.05 |
| 95% C.L. | 0.38 | 0.52 | 0.15 | 0.08 |
| Optical Properties at 73° F. | | | | |
| Haze (%)[7] | | | | |
| Avg. | 10.1 | 4.0 | 4.2 | 8.3 |
| Std. Dev. | 0.9 | 0.2 | 0.3 | 0.4 |
| 95% C.L. | 1.4 | 0.3 | 0.5 | 0.7 |
| Gauge | 8.23 | 9.31 | 5.76 | 8.66 |
| Std. Dev. | 0.25 | 0.76 | 0.65 | 0.78 |
| 95% C.L. | 0.40 | 1.21 | 1.04 | 1.23 |
| Total Transmission (%)[8] | | | | |
| Avg. | 90.6 | 91.9 | 91.9 | 90.4 |
| Std. Dev. | 0.2 | 0.3 | 0.2 | 0.1 |
| 95% C.L. | 0.3 | 0.5 | 0.3 | 0.2 |
| Gloss (45°)[9] | | | | |
| Avg. | 51. | 70. | 66. | 61. |
| Std. Dev. | 1. | 2. | 4. | 2. |
| 95% C.L. | 2. | 3. | 6. | 2. |
| Water Vapor Transmission at 100° F.[10] | | | | |
| Sample 1 | 1.06 | 0.21 | 0.34 | 0.33 |
| Sample 2 | 0.92 | 0.20 | 0.34 | 0.29 |
| Sample 3 | 0.84 | 0.19 | 0.34 | 0.28 |
| Gauge | | | | |
| Sample 1 | 8.64 | 9.75 | 6.37 | 7.68 |
| Sample 2 | 8.89 | 8.90 | 6.05 | 9.12 |
| Sample 3 | 8.86 | 10.13 | 6.46 | 9.47 |

TABLE 4

|  | Example 12 | Example 13 | Example 14 | Example 15 |
|---|---|---|---|---|
| Tensile at Break and 73° F. (PSI)[1] | | | | |
| Av.[2] Long | 21.2 × 100 | 23.3 × 100 | 15.1 × 100 | 30.3 × 100 |
| Std. Dev. | 1.1 × 100 | 0.4 × 100 | 3.9 × 100 | 2.4 × 100 |
| 95% C.L.[3] | 1.8 × 100 | 0.7 × 100 | 6.2 × 100 | 3.8 × 100 |
| Av. Trans. | 20.6 × 100 | 16.6 × 100 | 13.2 × 100 | 22.5 × 100 |
| Std. Dev. | 0.6 × 100 | 0.8 × 100 | 0.2 × 100 | 1.8 × 100 |
| 95% C.L. | 0.9 × 100 | 1.3 × 100 | 0.3 × 100 | 2.9 × 100 |
| Gauge Long.[4] | 8.86 | 9.15 | 12.00 | 8.76 |
| Std. Dev. | 0.65 | 0.68 | 5.20 | 0.39 |
| 95% C.L. | 1.04 | 1.08 | 8.27 | 0.62 |
| Gauge Trans. | 9.42 | 9.11 | 10.85 | 9.76 |
| Std. Dev. | 0.22 | 0.13 | 0.13 | 0.41 |
| 95% C.L. | 0.35 | 0.20 | 0.20 | 0.66 |
| Elongation at Break and 73° F. (PSI)[5] | | | | |
| Av. Long | 909. | 987. | 838. | 854. |
| Std. Dev. | 27. | 42. | 26. | 35. |
| 95% C.L. | 43. | 66. | 41. | 56. |
| Av. Trans. | 1034. | 947. | 991. | 1030. |
| Std. Dev. | 13. | 28. | 13. | 48. |
| 95% C.L. | 21. | 44. | 21. | 76. |
| Modulus at 73° F. (PSI)[6] | | | | |
| Av. Long. | 14.7 × 1000 | 14.0 × 1000 | 15.8 × 1000 | 17.5 × 1000 |
| Std. Dev. | 0.5 × 1000 | 0.5 × 1000 | 1.5 × 1000 | 0.9 × 1000 |
| 95% C.L. | 0.8 × 1000 | 0.8 × 1000 | 2.4 × 1000 | 1.4 × 1000 |
| Av. Trans. | 13.7 × 1000 | 13.0 × 1000 | 14.9 × 1000 | 15.5 × 1000 |
| Std. Dev. | 1.1 × 1000 | 0.6 × 1000 | 0.1 × 1000 | 0.6 × 1000 |
| 95% C.L. | 1.7 × 1000 | 0.9 × 1000 | 0.2 × 1000 | 1.0 × 1000 |
| Gauge Long. | 10.11 | 8.18 | 9.32 | 9.41 |
| Std. Dev. | 0.54 | 0.35 | 0.28 | 0.98 |
| 95% C.L. | 0.86 | 0.55 | 0.45 | 1.56 |
| Gauge Trans. | 9.57 | 8.79 | 10.51 | 9.42 |
| Std. Dev. | 0.72 | 0.48 | 0.38 | 0.28 |
| 95% C.L. | 1.14 | 0.77 | 0.61 | 0.44 |
| Optical Properties at 73° F. | | | | |
| Haze (%)[7] | | | | |
| Avg. | 19.4 | 18.1 | 3.6 | 6.7 |

TABLE 4-continued

|  | Example 12 | Example 13 | Example 14 | Example 15 |
|---|---|---|---|---|
| Std. Dev. | 1.9 | 1.5 | 0.3 | 0.3 |
| 95% C.L. | 3.0 | 2.4 | 0.5 | 0.5 |
| Gauge | 8.91 | 8.89 | 9.38 | 9.23 |
| Std. Dev. | 1.04 | 0.49 | 0.72 | 0.76 |
| 95% C.L. | 1.65 | 0.78 | 1.14 | 1.20 |
| Total Transmission (%)[8] | | | | |
| Avg. | 88.7 | 88.9 | 91.7 | 90.0 |
| Std. Dev. | 0.3 | 0.2 | 0.1 | 0.1 |
| 95% C.L. | 0.5 | 0.4 | 0.2 | 0.2 |
| Gloss (45°)[9] | | | | |
| Avg. | 52. | 56. | 66. | 62. |
| Std. Dev. | 2. | 2. | 2. | 2. |
| 95% C.L. | 3. | 3. | 3. | 2. |
| Water Vapor Transmission at 100° F.[10] | | | | |
| Sample 1 | 0.55 | 0.51 | 0.31 | 0.45 |
| Sample 2 | 0.46 | 0.60 | 0.31 | 0.40 |
| Sample 3 | 0.56 | 0.56 | 0.35 | 0.40 |
| Gauge | | | | |
| Sample 1 | 8.46 | 9.33 | 9.60 | 8.96 |
| Sample 2 | 10.10 | 8.14 | 10.76 | 10.45 |
| Sample 3 | 8.31 | 8.45 | 10.57 | 10.11 |

TABLE 5

|  | Example 16 | Example 17 | Example 18 |
|---|---|---|---|
| Tensile at Break and 73° F. (PSI)[1] | | | |
| Av.[2] Long | 30.6 × 100 | 33.9 × 100 | 44.0 × 100 |
| Std. Dev. | 2.7 × 100 | 2.0 × 100 | 1.7 × 100 |
| 95% C.L.[3] | 4.4 × 100 | 3.2 × 100 | 2.8 × 100 |
| Av. Trans. | 32.6 × 100 | 32.0 × 100 | 42.4 × 100 |
| Std. Dev. | 1.3 × 100 | 1.5 × 100 | 2.2 × 100 |
| 95% C.L. | 2.1 × 100 | 2.4 × 100 | 3.4 × 100 |
| Gauge Long.[4] | 10.94 | 11.64 | 9.88 |
| Std. Dev. | 0.71 | 0.75 | 0.43 |
| 95% C.L. | 1.13 | 1.19 | 0.68 |
| Gauge Trans. | 11.49 | 11.09 | 8.83 |
| Std. Dev. | 0.27 | 0.36 | 0.24 |
| 95% C.L. | 0.44 | 0.57 | 0.38 |
| Elongation at Break and 73° F. (PSI)[5] | | | |
| Av. Long | 1018. | 1107. | 973. |
| Std. Dev. | 61. | 37. | 38. |
| 95% C.L. | 96. | 59. | 60. |
| Av. Trans. | 1153. | 1112. | 954. |
| Std. Dev. | 28. | 19. | 25. |
| 95% C.L. | 44. | 30. | 40. |
| Modulus at 73° F. (PSI)[6] | | | |
| Av. Long. | 25.8 × 1000 | 27.9 × 1000 | 45.0 × 1000 |
| Std. Dev. | 1.4 × 1000 | 2.0 × 1000 | 1.6 × 1000 |
| 95% C.L. | 2.2 × 1000 | 3.2 × 1000 | 2.5 × 1000 |
| Av. Trans. | 22.6 × 1000 | 25.1 × 1000 | 38.4 × 1000 |
| Std. Dev. | 1.0 × 1000 | 1.7 × 1000 | 0.6 × 1000 |
| 95% C.L. | 1.6 × 1000 | 2.8 × 1000 | 1.0 × 1000 |
| Gauge Long. | 10.64 | 10.70 | 8.92 |
| Std. Dev. | 0.21 | 0.18 | 0.16 |
| 95% C.L. | 0.33 | 0.28 | 0.25 |
| Gauge Trans. | 11.21 | 11.01 | 9.18 |
| Std. Dev. | 0.43 | 0.25 | 0.06 |
| 95% C.L. | 0.69 | 0.40 | 0.09 |
| Optical Properties at 73° F. | | | |
| Haze (%)[7] | | | |
| Avg. | 9.3 | 9.4 | 10.7 |
| Std. Dev. | 1.3 | 1.3 | 0.9 |
| 95% C.L. | 2.0 | 2.1 | 1.4 |
| Gauge | 9.94 | 10.66 | 8.88 |
| Std. Dev. | 0.70 | 1.10 | 0.33 |
| 95% C.L. | 1.12 | 1.74 | 0.53 |
| Total Transmission (%)[8] | | | |
| Avg. | 89.1 | 89.5 | 90.7 |
| Std. Dev. | 0.5 | 0.5 | 0.8 |
| 95% C.L. | 0.8 | 0.7 | 1.3 |
| Gloss (45°)[9] | | | |
| Avg. | 65. | 69. | 74. |
| Std. Dev. | 3. | 3. | 1. |
| 95% C.L. | 4. | 4. | 2. |
| Water Vapor Transmission at 100° F.[10] | | | |
| Sample 1 | 0.18 | 0.21 | 0.20 |
| Sample 2 | 0.20 | 0.14 | 0.20 |
| Sample 3 | 0.15 | 0.24 | 0.21 |
| Gauge | | | |
| Sample 1 | 11.72 | 9.86 | 9.71 |
| Sample 2 | 10.17 | 11.81 | 8.72 |
| Sample 3 | 10.59 | 9.55 | 9.50 |

The following footnotes applies to Tables 1 through 5.
[1]ASTM D882-81.
[2]All average values in Tables 1 and 2 are averages obtained from four (4) replicate measurements.
[3]C.L. is Confidence Limit - for example, in a reported average value of 10 with a 95% C.L. of 2, in 100 replicate readings, 95 would have a value between 8 and 12 inclusive.
[4]Gauge measured in mils. Values listed are for corresponding examples. Gauge values for tensile at break apply for elongation at break as well. Gauge values for haze apply for other optical properties as well.
[5]ASTM D882-81.
[6]ASTM D882-81.
[7]ASTM D1003-61 (reapproved 1977).
[8]ASTM D1003 Method A.
[9]ASTM D2457-70 (reapproved 1977).
[10]ASTM F372.

Films in accordance with the present invention are preferably cross-linked. This is preferably done by irradiation, i.e. bombarding the film with particulate and non-particulate radiations such as high energy electrons from an accelerator or cobalt-60 gamma rays, to cross-link the materials of the film. Cross-linking increases the structural strength of film and/or the force at which the material can be stretched before tearing apart, and may also improve the optical properties of the film and change the high temperature properties of the film. A preferred irradiation dosage level is in the range of from about 2 Megarads (M.R.) to about 5 M.R. In the case of films having a copolyester, lower dosages of irradiation may be required to keep extractables at a tolerable level.

Cross-linking may also be accomplished chemically by the use of peroxides.

Pouches made in accordance with the present invention may be heat sealed by various means well known in the art. Impulse and hot bar sealing are preferred means. Some structures having a relatively thick layer of EVA may be sealed by radio-frequency sealing.

The films according to the present invention are preferably formed by cast coextrusion. A hot blown process may also be employed, although optical properties of the resulting pouch would be inferior to those from a cast coextrusion process.

An important property of a flexible medical solution bag is the moisture vapor transmission rate. Typically, the concentrations of the medical solutions inside the pouch must be carefully maintained. Pouches or bags currently made from PVC require moisture barrier materials in an overwrap arrangement i.e. a separate overwrap material, to insure that the concentration of solutions obtained in the pouch is not affected. A pouch made for example according to Example 3 of the present invention, when incorporated in a large (greater than 1 liter) solution bag, has superior properties such that additional overwrap would not be required in order to maintain concentration of the solution. Similarly, Example 9 containing the ethylene propylene copolymer core (4.25% ethylene) and Examples 16 and 17 containing the VLDPE, as well as Example 18 containing the modified ethylene propylene copolymer, all showed excellent values for moisture vapor transmission rate. These would, therefore, also be preferred examples for producing a pouch for medical solutions such as intravenous solutions without the need for separate overwrap material to maintain the concentration of the solution. Examples 16 and 17 would be particularly useful because of their lower modulus values, and would provide greater flexibility to the medical solution pouch.

Examples 5 and 6, both of which include a flexible copolyester in the outer layer, would still require overwrap protection because of their high moisture permeability.

The very high moisture permeability of the flexible copolyesters, however, is itself an advantage during autoclaving of solution containing pouches. For example, in parenteral solution pouches where polypropylene forms an outside layer and an interior layer contains EVA water is absorbed through the polypropylene layer into the EVA layer during autoclaving of the pouch or bag. After autoclaving is completed, the absorbed water does not completely remove from the material, thereby leaving a very hazy or cloudy bag structure. Optics are critical in the field of parenteral bags or pouches in order to insure that the medical solution contains no foreign contaminants.

It has been found that by using a flexible copolyester, water absorbed by an interior layer such as ethylene vinyl acetate copolymer during autoclaving can subsequently escape out through the copolyester outer layer. This allows the optical properties of the flexible pouch to be maintained. Of the examples listed, Examples 2, 6, and 7 exhibit especially good optics. These particular structures would therefore be especially useful in applications where optical quality is a critical parameter for the solution containing bag or pouch.

Another key feature of the present invention, and of importance in medical solution packaging is the flexibility and collapsibility of the laminate material. Flexibility aids in the drainage of a medical solution from the bag or pouch. Examples 2, 5 and 6 described above exhibit excellent flexibility as demonstrated by the modulus values of those examples.

Stress cracking of the outer layers of some parenteral bags, for example those with EPC outer layers, has proven to be a problem in some cases. In those films of the present invention in which a flexible copolyester has been employed as an outer layer, stress cracking of the laminate has been materially reduced.

Several additional multilayer structures were also tested. These additional structures made use of an outside layer of a flexible copolyester, often in combination with at least one interior layer of VLDPE.

The structures of Examples 19–31 are listed below, beginning with the outside layer and ending with the inside or sealant layer. Examples 19–31 included commercial materials as in examples 1–18, except that the EPC for examples 19–26 and 29 to 31 was M7853-368A; a polyallomer EPC block copolymer, melt flow index of about 12, from Eastman; and the EVA of examples 19 and 23 was Exxon XQ92.36, 28% vinyl acetate, melt flow index of about 2.0.

Example 19: EPC/EVA/EPC (comparative example)
Example 20: flexible copolyester/EMA/EVA/EPC
Example 21: flexible copolyester/modified EVA/EVA/EPC (9 mil thickness)
Example 22: as in Example 21; 7 mil thickness
Example 23: flexible copolyester/modified EVA/EVA(28%VA)/EPC
Example 24: flexible copolyester/modified EVA/EPDM/modified EVA/EPC
Example 25: as in Example 24; 7 mil thickness
Example 26: as in Example 24, but irradiated with 5 MR.

The above examples, except for Example 26, were irradiated with 3 MR irradiation.

Except for examples 22 and 25, all samples were about 9 mil thickness.

Example 27: flexible copolyester/modified EVA/VLDPE/modified EVA/EPC (9 mil)
Example 28: as in previous example; 11 mil.
Example 29: flexible copolyester/modified EVA/VLDPE/modified EVA/EPC (block copolymer) (13 mil)
Example 30: flexible copolyester/modified EVA/VLDPE+EPDM/modified EVA/EPC (13 mil)
Example 31: flexible copolyester/modified EVA/modified EPC/modified EVA/EPC.

Tables 6–9 appearing below show the results of physical testing of examples 19–31 for selected physical properties. The footnote numbers appearing in Tables 6–9 correspond to those for Tables 1–5, and designate ASTM test methodology.

TABLE 6

|  | Example 19 | Example 20 | Example 21 | Example 22 |
|---|---|---|---|---|
| Tensile at Break and 73° F. (PSI)[1] | | | | |
| Av.[2] Long. | 49.7 × 100 | 26.8 × 100 | 33.3 × 100 | 34.9 × 100 |

TABLE 6-continued

|  | Example 19 | Example 20 | Example 21 | Example 22 |
|---|---|---|---|---|
| Std. Dev. | 10.7 × 100 | 1.8 × 100 | 1.8 × 100 | 3.3 × 100 |
| 95% C.L.[3] | 17.0 × 100 | 2.8 × 100 | 2.9 × 100 | 5.3 × 100 |
| Av. Trans. | 34.0 × 100 | 33.2 × 100 | 31.0 × 100 | 40.7 × 100 |
| Std. Dev. | 3.0 × 100 | 0.5 × 100 | 2.4 × 100 | 4.0 × 100 |
| 95% C.L. | 4.8 × 100 | 0.8 × 100 | 3.8 × 100 | 6.4 × 100 |
| Gauge Long.[4] | 10.38 | 10.23 | 8.68 | 6.40 |
| Std. Dev. | 0.71 | 0.68 | 0.46 | 0.50 |
| 95% C.L. | 1.14 | 1.08 | 0.73 | 0.79 |
| Gauge Trans. | 10.15 | 10.25 | 9.50 | 6.43 |
| Std. Dev. | 0.17 | 0.10 | 0.18 | 0.22 |
| 95% C.L. | 0.28 | 0.16 | 0.29 | 0.35 |
| Elongation at Break and 73° F. (PSI)[5] | | | | |
| Av. Long | 982. | 803. | 808. | 731. |
| Std. Dev. | 65. | 24. | 6. | 21. |
| 95% C.L. | 104. | 38. | 10. | 34. |
| Av. Trans. | 921. | 980. | 934. | 935. |
| Std. Dev. | 37. | 14. | 15. | 29. |
| 95% C.L. | 60. | 22. | 23. | 46. |
| Modulus at 73° F. (PSI)[6] | | | | |
| Av. Long. | 15.8 × 1000 | 15.3 × 1000 | 14.7 × 1000 | 14.3 × 1000 |
| Std. Dev. | 3.6 × 1000 | 1.5 × 1000 | 1.9 × 1000 | 1.2 × 1000 |
| 95% C.L. | 5.7 × 1000 | 2.3 × 1000 | 3.1 × 1000 | 1.9 × 1000 |
| Av. Trans. | 14.3 × 1000 | 10.9 × 1000 | 12.1 × 1000 | 12.1 × 1000 |
| Std. Dev. | 2.9 × 1000 | 1.3 × 1000 | 0.9 × 1000 | 0.9 × 1000 |
| 95% C.L. | 4.6 × 1000 | 2.1 × 1000 | 1.4 × 1000 | 1.4 × 1000 |
| Gauge Long. | 9.62 | 10.24 | 9.76 | 7.43 |
| Std. Dev. | 0.25 | 0.48 | 0.33 | 0.17 |
| 95% C.L. | 0.40 | 0.77 | 0.52 | 0.26 |
| Gauge Trans. | 10.70 | 10.44 | 9.29 | 6.92 |
| Std. Dev. | 0.29 | 0.21 | 0.68 | 0.33 |
| 95% C.L. | 0.46 | 0.33 | 1.08 | 0.52 |
| Optical Properties at 73° F. | | | | |
| Haze (%)[7] | | | | |
| Avg. | 2.2 | 2.7 | 1.1 | 1.0 |
| Std. Dev. | 0.1 | 0.4 | 0.2 | 0.2 |
| 95% C.L. | 0.2 | 0.7 | 0.4 | 0.4 |
| Gauge | 10.70 | 10.65 | 9.74 | 7.64 |
| Std. Dev. | 0.49 | 0.58 | 0.50 | 0.33 |
| 95% C.L. | 0.78 | 0.92 | 0.79 | 0.53 |
| Total Transmission (%)[8] | | | | |
| Avg. | 92.7 | 92.4 | 92.4 | 92.4 |
| Std. Dev. | 0.1 | 0.2 | 0.1 | 0.1 |
| 95% C.L. | 0.1 | 0.4 | 0.1 | 0.1 |
| Water Vapor Transmission at 100° F.[10] | | | | |
| Sample 1 | 0.78 | 1.14 | 1.05 | 1.21 |
| Sample 2 | 0.60 | 0.85 | 0.99 | 1.08 |
| Sample 3 | 0.70 | 1.30 | 0.96 | 1.06 |
| Gauge | | | | |
| Sample 1 | 10.62 | 10.68 | 9.24 | 6.80 |
| Sample 2 | 9.83 | 10.60 | 9.11 | 7.06 |
| Sample 3 | 10.48 | 10.63 | 9.20 | 7.16 |

TABLE 7

|  | Example 23 | Example 24 | Example 25 | Example 26 |
|---|---|---|---|---|
| Tensile at Break and 73° F. (PSI)[1] | | | | |
| Av.[2] Long. | 32.6 × 100 | 25.3 × 100 | 27.1 × 100 | 22.4 × 100 |
| Std. Dev. | 7.8 × 100 | 1.8 × 100 | 3.0 × 100 | 1.4 × 100 |
| 95% C.L.[3] | 12.5 × 100 | 2.8 × 100 | 4.7 × 100 | 2.3 × 100 |
| Av. Trans. | 44.9 × 100 | 21.4 × 100 | 22.0 × 100 | 17.2 × 100 |
| Std. Dev. | 2.8 × 100 | 0.9 × 100 | 1.0 × 100 | 4.1 × 100 |
| 95% C.L. | 4.4 × 100 | 1.4 × 100 | 1.7 × 100 | 6.5 × 100 |
| Gauge Long.[4] | 8.05 | 8.40 | 6.45 | 7.90 |
| Std. Dev. | 0.33 | 0.42 | 0.60 | 0.43 |
| 95% C.L. | 0.53 | 0.68 | 0.96 | 0.69 |
| Gauge Trans. | 8.58 | 9.35 | 7.70 | 8.85 |
| Std. Dev. | 0.13 | 0.19 | 0.12 | 0.21 |
| 95% C.L. | 0.20 | 0.30 | 0.18 | 0.33 |
| Elongation at | | | | |

TABLE 7-continued

| | Example 23 | Example 24 | Example 25 | Example 26 |
|---|---|---|---|---|
| Break and 73° F. (PSI)[5] | | | | |
| Av. Long | 720. | 786. | 731. | 728. |
| Std. Dev. | 75. | 17. | 32. | 27. |
| 95% C.L. | 119. | 28. | 51. | 43. |
| Av. Trans. | 988. | 840. | 836. | 713. |
| Std. Dev. | 27. | 10. | 33. | 123. |
| 95% C.L. | 43. | 16. | 53. | 196. |
| Modulus at 73° F. (PSI)[6] | | | | |
| Av. Long. | $13.2 \times 1000$ | $14.9 \times 1000$ | $13.7 \times 1000$ | $13.0 \times 1000$ |
| Std. Dev. | $0.3 \times 1000$ | $1.6 \times 1000$ | $1.8 \times 1000$ | $1.1 \times 1000$ |
| 95% C.L. | $0.5 \times 1000$ | $2.5 \times 1000$ | $2.8 \times 1000$ | $1.7 \times 1000$ |
| Av. Trans. | $10.7 \times 1000$ | $11.2 \times 1000$ | $11.0 \times 1000$ | $11.7 \times 1000$ |
| Std. Dev. | $0.4 \times 1000$ | $0.9 \times 1000$ | $1.0 \times 1000$ | $2.0 \times 1000$ |
| 95% C.L. | $0.7 \times 1000$ | $1.5 \times 1000$ | $1.6 \times 1000$ | $3.2 \times 1000$ |
| Gauge Long. | 8.48 | 8.64 | 7.72 | 7.99 |
| Std. Dev. | 0.53 | 0.95 | 0.28 | 0.66 |
| 95% C.L. | 0.84 | 1.51 | 0.45 | 1.05 |
| Gauge Trans. | 8.94 | 9.23 | 7.75 | 8.76 |
| Std. Dev. | 0.18 | 1.11 | 0.92 | 0.35 |
| 95% C.L. | 0.28 | 1.76 | 1.46 | 0.56 |
| Optical Properties at 73° F. | | | | |
| Haze (%)[7] | | | | |
| Avg. | 1.0 | 1.8 | 0.8 | 1.4 |
| Std. Dev. | 0.4 | 0.6 | 0.1 | 0.4 |
| 95% C.L. | 0.6 | 1.0 | 0.2 | 0.6 |
| Gauge | 9.26 | 9.25 | 7.35 | 9.32 |
| Std. Dev. | 0.87 | 1.19 | 0.42 | 0.93 |
| 95% C.L. | 1.38 | 1.89 | 0.67 | 1.48 |
| Total Transmission (%)[8] | | | | |
| Avg. | 92.4 | 91.9 | 92.2 | 91.8 |
| Std. Dev. | 0.1 | 0.2 | 0.1 | 0.3 |
| 95% C.L. | 0.2 | 0.2 | 0.1 | 0.4 |
| Water Vapor Transmission at 100° F.[10] | | | | |
| Sample 1 | 0.94 | 0.70 | 0.76 | 0.62 |
| Sample 2 | 0.91 | 0.71 | 0.77 | 0.71 |
| Sample 3 | 1.00 | 0.64 | 0.81 | 0.57 |
| Gauge | | | | |
| Sample 1 | 8.92 | 8.48 | 7.19 | 9.77 |
| Sample 2 | 8.57 | 7.68 | 8.13 | 7.82 |
| Sample 3 | 8.64 | 9.57 | 6.74 | 9.66 |

TABLE 8

| | Example 27 | Example 28 | Example 29 | Example 30 |
|---|---|---|---|---|
| Tensile at Break and 73° F. (PSI)[1] | | | | |
| Av.[2] Long | $28.5 \times 100$ | $25.9 \times 100$ | $27.3 \times 100$ | $24.3 \times 100$ |
| Std. Dev. | $2.0 \times 100$ | $2.0 \times 100$ | $0.9 \times 100$ | $0.9 \times 100$ |
| 95% C.L.[3] | $3.2 \times 100$ | $3.3 \times 100$ | $1.5 \times 100$ | $1.4 \times 100$ |
| Av. Trans. | $30.8 \times 100$ | $30.2 \times 100$ | $24.0 \times 100$ | $24.2 \times 100$ |
| Std. Dev. | $1.9 \times 100$ | $1.9 \times 100$ | $0.8 \times 100$ | $0.9 \times 100$ |
| 95% C.L. | $3.1 \times 100$ | $3.1 \times 100$ | $1.3 \times 100$ | $1.4 \times 100$ |
| Gauge Long.[4] | 8.25 | 10.95 | 12.55 | 11.75 |
| Std. Dev. | 0.62 | 0.85 | 0.52 | 0.59 |
| 95% C.L. | 0.99 | 1.35 | 0.83 | 0.94 |
| Gauge Trans. | 7.70 | 10.03 | 12.33 | 12.30 |
| Std. Dev. | 0.08 | 0.19 | 0.31 | 0.24 |
| 95% C.L. | 0.13 | 0.30 | 0.49 | 0.39 |
| Elongation at Break and 73° F. (PSI)[5] | | | | |
| Av. Long | 822. | 856. | 917. | 842. |
| Std. Dev. | 34. | 31. | 21. | 16. |
| 95% C.L. | 54. | 49. | 33. | 25. |
| Av. Trans. | 915. | 972. | 884. | 951. |
| Std. Dev. | 32. | 63. | 18. | 16. |
| 95% C.L. | 51. | 100. | 29. | 25. |
| Modulus at 73° F. (PSI)[6] | | | | |
| Av. Long. | $17.4 \times 1000$ | $16.6 \times 1000$ | $15.6 \times 1000$ | $9.5 \times 1000$ |
| Std. Dev. | $0.5 \times 1000$ | $0.6 \times 1000$ | $0.8 \times 1000$ | $0.9 \times 1000$ |

TABLE 8-continued

|  | Example 27 | Example 28 | Example 29 | Example 30 |
|---|---|---|---|---|
| 95% C.L. | 0.8 × 1000 | 1.0 × 1000 | 1.2 × 1000 | 1.5 × 1000 |
| Av. Trans. | 17.1 × 1000 | 16.1 × 1000 | 15.9 × 1000 | 9.8 × 1000 |
| Std. Dev. | 1.2 × 1000 | 0.8 × 1000 | 0.6 × 1000 | 0.4 × 1000 |
| 95% C.L. | 1.9 × 1000 | 1.3 × 1000 | 0.9 × 1000 | 0.6 × 1000 |
| Gauge Long. | 8.01 | 10.38 | 11.93 | 11.54 |
| Std. Dev. | 0.24 | 0.43 | 0.49 | 0.29 |
| 95% C.L. | 0.38 | 0.69 | 0.79 | 0.46 |
| Gauge Trans. | 8.01 | 11.31 | 12.73 | 12.16 |
| Std. Dev. | 0.27 | 0.36 | 0.20 | 0.10 |
| 95% C.L. | 0.43 | 0.57 | 0.32 | 0.17 |
| Optical Properties at 73° F. | | | | |
| Haze (%)[7] | | | | |
| Avg. | 4.5 | 6.9 | 8.8 | 7.4 |
| Std. Dev. | 0.4 | 1.2 | 1.0 | 1.1 |
| 95% C.L. | 0.6 | 1.9 | 1.6 | 1.7 |
| Gauge | 7.93 | 10.98 | 2.48 | 11.95 |
| Std. Dev. | 0.50 | 1.16 | 0.63 | 0.93 |
| 95% C.L. | 0.79 | 1.85 | 1.00 | 1.47 |
| Total Transmission (%)[8] | | | | |
| Avg. | 91.2 | 90.3 | 89.7 | 89.1 |
| Std. Dev. | 0.2 | 0.5 | 0.3 | 0.4 |
| 95% C.L. | 0.3 | 0.9 | 0.5 | 0.7 |
| Gloss (45°)[9] | | | | |
| Avg. | 87. | 83. | 78. | 80. |
| Std. Dev. | 3. | 3. | 2. | 3. |
| 95% C.L. | 5. | 5. | 4. | 5. |
| Water Vapor Transmission at 100° F.[10] | | | | |
| Sample 1 | 0.32 | 0.22 | 0.20 | 0.32 |
| Sample 2 | 0.29 | 0.23 | 0.19 | 0.31 |
| Sample 3 | 0.28 | 0.21 | 0.20 | 0.31 |
| Gauge | | | | |
| Sample 1 | 8.26 | 10.98 | 12.40 | 11.91 |
| Sample 2 | 7.91 | 10.46 | 12.66 | 11.94 |
| Sample 3 | 8.14 | 10.90 | 12.12 | 11.91 |

TABLE 9

|  | Example 31 |
|---|---|
| Tensile at Break and 73° F. (PSI)[1] | |
| Av.[2] Long | 37.7 × 100 |
| Std. Dev. | 2.9 × 100 |
| 95% C.L.[3] | 4.6 × 100 |
| Av. Trans. | 38.0 × 100 |
| Std. Dev. | 1.1 × 100 |
| 95% C.L. | 1.7 × 100 |
| Gauge Long.[4] | 12.60 |
| Std. Dev. | 0.58 |
| 95% C.L. | 0.93 |
| Gauge Trans. | 12.25 |
| Std. Dev. | 0.13 |
| 95% C.L. | 0.21 |
| Elongation at Break and 73° F. (PSI)[5] | |
| Av. Long | 991. |
| Std. Dev. | 50. |
| 95% C.L. | 79. |
| Av. Trans. | 985. |
| Std. Dev. | 20. |
| 95% C.L. | 31. |
| Modulus at 73° F. (PSI)[6] | |
| Av. Long. | 40.4 × 1000 |
| Std. Dev. | 2.5 × 1000 |
| 95% C.L. | 3.9 × 1000 |
| Av. Trans. | 31.4 × 1000 |
| Std. Dev. | 1.1 × 1000 |
| 95% C.L. | 1.7 × 1000 |
| Gauge Long. | 14.11 |
| Std. Dev. | 0.58 |
| 95% C.L. | 0.93 |
| Gauge Trans. | 12.78 |
| Std. Dev. | 0.16 |
| 95% C.L. | 0.25 |
| Optical Properties at 73° F. | |
| Haze (%)[7] | |
| Avg. | 9.9 |
| Std. Dev. | 1.0 |
| 95% C.L. | 1.6 |
| Gauge | 13.10 |
| Std. Dev. | 0.61 |
| 95% C.L. | 0.96 |
| Total Transmission (%)[8] | |
| Avg. | 89.7 |
| Std. Dev. | 4.3 |
| 95% C.L. | 6.9 |
| Gloss (45°)[9] | |
| Avg. | 68. |
| Std. Dev. | 2. |
| 95% C.L. | 3. |
| Water Vapor Transmission at 100° F.[10] | |
| Sample 1 | 0.18 |
| Sample 2 | 0.18 |
| Sample 3 | 0.20 |
| Gauge | |
| Sample 1 | 12.68 |
| Sample 2 | 13.54 |
| Sample 3 | 12.91 |

The use of VLDPE in combination with an outside layer of a flexible copolyester allows the influx of moisture during elevated autoclaving temperatures, i.e. around 230° F. At these high temperatures, the barrier properties of VLDPE are greatly reduced. After autoclaving and during cooling, the absorbed moisture in the interior layer or layers of the pouch is allowed to escape through the flexible copolyester. At the same time, the barrier properties of the VLDPE interior layer are restored. In this fashion, the concentration of the medical solution is maintained while eliminating absorbed moisture from the interior layers of the pouch, thereby reducing haze.

Because of the good moisture barrier properties of these films, they may eliminate the need in many cases for a separate overwrap material to maintain the concentration of the medical solution. Three commercially available overwraps of 6 mil, 4.5 mil, and 4.5 mil thickness, exhibited moisture vapor transmission rates ranging from 0.12 to 0.24 grams/(24 hours, 100 square inches) at 100° F. and 100% relative humidity. Several of the examples discussed above, including examples 3, 9, 16, 17, 18, 29, and 31, compare favorably with these overwrap materials with respect to moisture vapor barrier properties.

The laminated films of the present invention also exhibit good seal strength, and abuse resistance, and do not substantially distort during autoclaving.

It should be noted that the detailed description and specific examples which indicate the presently preferred embodiments of the invention are given by way of illustration only. Various changes and modifications within the spirit and scope of the claims will become apparent of those of ordinary skill in the art upon review of the above detailed description and examples.

What is claimed is:

1. A flexible film comprising:
   (a) a sealant layer comprising ethylene propylene copolymer; modified ethylene propylene copolymer or flexible copolyester;
   (b) a second interior layer comprising
      (i) a blend of ethylene propylene copolymer with a polymeric material selected from the group consisting of modified ethylene propylene copolymer, a blend of ethylene propylene monomer and ethylene vinyl acetate copolymer, ethylene propylene diene monomer, and very low density polyethylene, or
      (ii) modified ethylene vinyl acetate copolymer; or
      (iii) a blend of modified ethylene propylene copolymer and very low density polyethylene;
   (c) a third interior layer comprising a polymeric material which imparts flexibility to the film;
   (d) a fourth interior layer comprising
      (i) a polymeric material or blend of materials substantially similar to the second layer, or
      (ii) ethylene methacrylate copolymer; and
   (e) a fifth outer layer comprising a flexible copolyester.

2. A multi-layer flexible film comprising:
   (a) a sealant layer comprising ethylene propylene copolymer;
   (b) a second interior layer comprising a blend of ethylene propylene copolymer with a polymeric material which imparts flexibility to the film;
   (c) a third interior layer comprising a polymeric material selected from the group consisting of a blend of ethylene propylene monomer and ethylene vinyl acetate copolymer, a blend of ethylene propylene monomer and polypropylene, and ethylene propylene diene monomer;
   (d) a fourth interior layer comprising
      (i) a blend substantially similar to the second interior layer;
      (ii) ethylene methacrylate copolymer;
   (e) a fifth interior layer comprising
      (i) a blend of ethylene propylene monomer and ethylene vinyl acetate copolymer, or
      (ii) ethylene propylene diene monomer;
   (f) a sixth interior layer comprising
      (i) a blend substantially similar to the fourth interior layer, or
      (ii) an elastomeric adhesive material; and
   (g) a seventh outer layer comprising flexible copolyester.

3. A flexible laminate according to claim 2 wherein the polymeric material of the second interior layer comprises a blend of
   (a) ethylene propylene monomer and ethylene vinyl acetate copolymer, or
   (b) ethylene propylene monomer and polypropylene.

4. A flexible laminate according to claim 2 wherein the elastomeric adhesive material of the sixth interior layer comprises a modified ethylene vinyl acetate adhesive.

5. A flexible pouch made from a film of claim 2.

* * * * *